US012337838B2

(12) United States Patent
Fukui et al.

(10) Patent No.: US 12,337,838 B2
(45) Date of Patent: Jun. 24, 2025

(54) DRIVING ASSISTANCE APPARATUS, DRIVING ASSISTANCE METHOD, AND COMPUTER-READABLE STORAGE MEDIUM STORING DRIVING ASSISTANCE PROGRAM

(71) Applicant: TOYOTA JIDOSHA KABUSHIKI KAISHA, Toyota (JP)

(72) Inventors: Yusuke Fukui, Toyota (JP); Yuhei Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/139,731

(22) Filed: Apr. 26, 2023

(65) Prior Publication Data

US 2023/0347885 A1    Nov. 2, 2023

(30) Foreign Application Priority Data

Apr. 27, 2022   (JP) ................................. 2022-073060

(51) Int. Cl.
  *B60W 30/09*    (2012.01)
  *B60W 30/095*   (2012.01)
  *B60W 50/14*    (2020.01)

(52) U.S. Cl.
  CPC ........ *B60W 30/0956* (2013.01); *B60W 30/09* (2013.01); *B60W 50/14* (2013.01); *B60W 2540/18* (2013.01); *B60W 2554/4041* (2020.02)

(58) Field of Classification Search
  CPC .. B60W 30/0956; B60W 30/09; B60W 50/14; B60W 2554/4041; B60W 2540/18; G08G 1/16

USPC .......................................................... 701/301
See application file for complete search history.

(56) References Cited

U.S. PATENT DOCUMENTS

| | | |
|---|---|---|
| 9,105,190 B2 | 8/2015 | Akiyama |
| 9,393,960 B2 | 7/2016 | Kodaira |
| 9,483,945 B2 | 11/2016 | Okita et al. |
| 9,873,412 B2 | 1/2018 | Moriizumi |

(Continued)

FOREIGN PATENT DOCUMENTS

| | | | |
|---|---|---|---|
| EP | 1469442 A2 * | 10/2004 | ............. G08G 1/166 |
| JP | 2000-348299 A | 12/2000 | |

(Continued)

*Primary Examiner* — Tuan C To
(74) *Attorney, Agent, or Firm* — Finnegan, Henderson, Farabow, Garrett and Dunner LLP

(57) ABSTRACT

A driving assistance apparatus comprises an electronic control unit which executes a driving assistance control to alert a driver of an own vehicle for avoiding a collision of the own vehicle with an oncoming vehicle when the own vehicle performs a crossing movement. The crossing movement is a movement of the own vehicle to turn, crossing a line along which the oncoming vehicle moves. The electronic control unit detects and sets the oncoming vehicle as an alert-target oncoming vehicle, executes the driving assistance control when determining that the own vehicle is going to collide with the alert-target oncoming vehicle after determining that the crossing movement of the own vehicle starts and before a predetermined after-crossing-start elapsing time elapses, and keeps the driving assistance control unexecuted after the after-crossing-start elapsing time threshold elapses.

8 Claims, 8 Drawing Sheets

(56) References Cited

U.S. PATENT DOCUMENTS

| | | | |
|---|---|---|---|
| 10,276,048 B2* | 4/2019 | Beaurepaire | G08G 1/143 |
| 10,793,147 B2 | 10/2020 | Kaminade et al. | |
| 10,850,717 B2* | 12/2020 | Ito | B60T 8/17 |
| 2005/0143889 A1* | 6/2005 | Isaji | G08G 1/161 |
| | | | 701/80 |
| 2014/0195141 A1* | 7/2014 | Nagata | B60T 7/22 |
| | | | 701/301 |
| 2018/0178841 A1 | 6/2018 | Ikedo et al. | |
| 2020/0198628 A1* | 6/2020 | Matsunaga | B60W 30/09 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2023/0008744 A1* | 1/2023 | Kozono | B60W 30/09 |

FOREIGN PATENT DOCUMENTS

| | | |
|---|---|---|
| JP | 2012-022671 A | 2/2012 |
| JP | 2018-101373 A | 6/2018 |

* cited by examiner

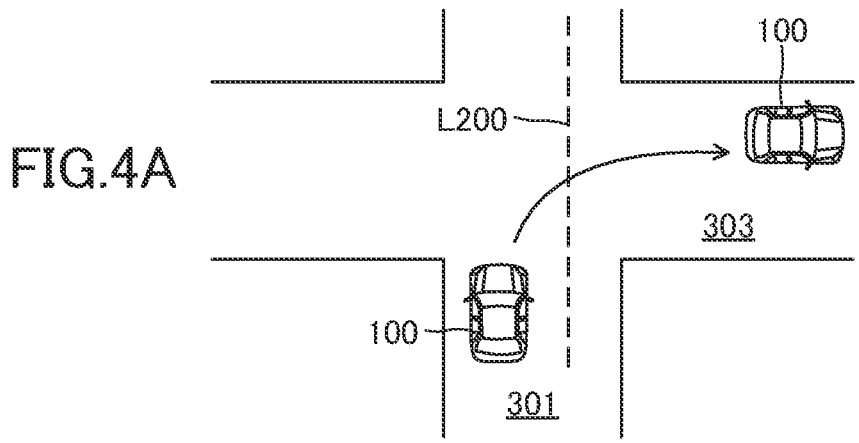
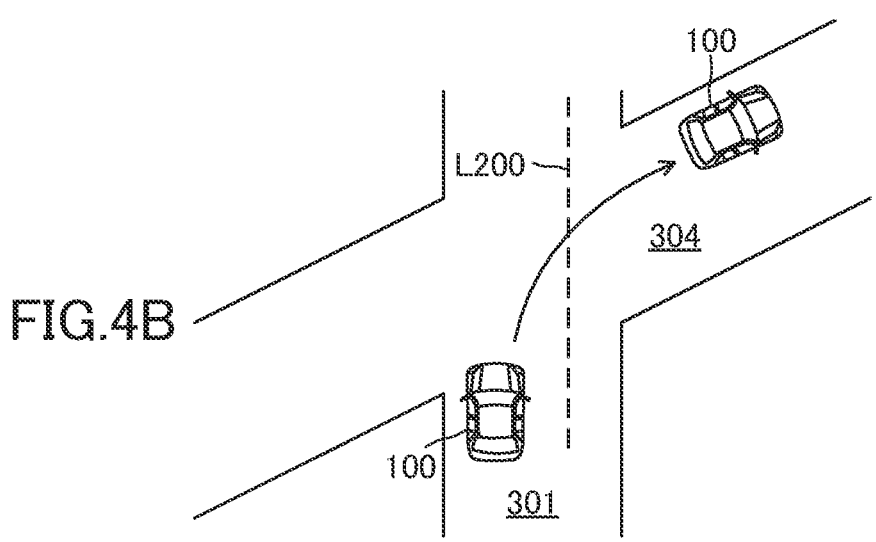
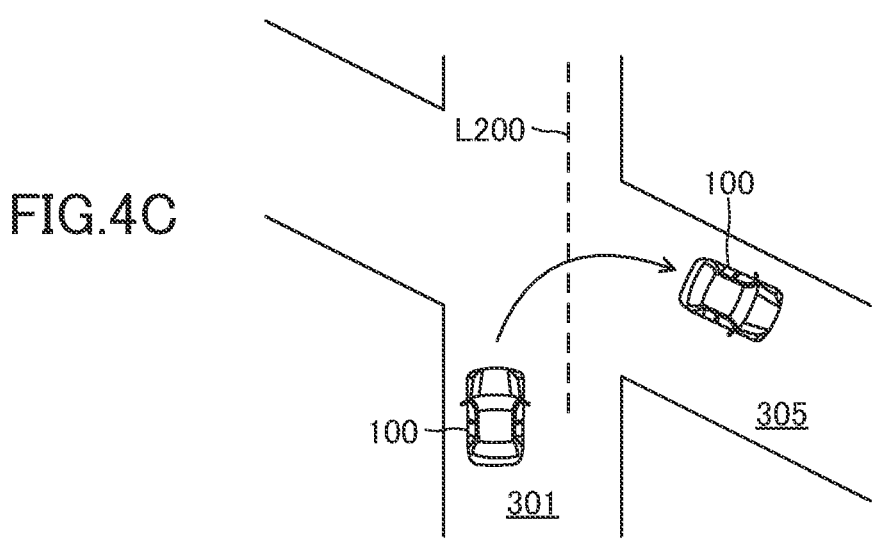

DRIVING ASSISTANCE APPARATUS, DRIVING ASSISTANCE METHOD, AND COMPUTER-READABLE STORAGE MEDIUM STORING DRIVING ASSISTANCE PROGRAM

CROSS-REFERENCE TO RELATED APPLICATIONS

This application claims priority to Japanese patent application No. JP 2022-073060 filed on Apr. 27, 2022, the content of which is hereby incorporated by reference in its entirety.

BACKGROUND

Field

The invention relates to a driving assistance apparatus, a driving assistance method, and a computer-readable storage medium storing driving assistance program.

Description of the Related Art

There is known a driving assistance apparatus for avoiding a collision of an own vehicle with an oncoming vehicle by alerting a driver of the own vehicle when the own vehicle turning right at a traffic intersection is going to collide with the oncoming vehicle. There is also known a driving assistance apparatus which determines whether there is an oncoming vehicle which is going to collide with the own vehicle when determining that the own vehicle starts to turn right (for example, see JP 2012-22671 A). This driving assistance apparatus determines whether there is an oncoming vehicle which is going to collide with the own vehicle, based on an orientation of the own vehicle taken just before determining that the own vehicle starts to turn right.

Thereby, the known driving assistance apparatus tries to accurately determine whether there is an oncoming vehicle which is going to collide with the own vehicle. In this regard, in case that the own vehicle stops just after starting to turn right, and then the own vehicle starts to turn right again, the known driving assistance apparatus determines whether there is an oncoming vehicle which is going to collide with the own vehicle, based on the orientation of the own vehicle taken just before the own vehicle starts to turn right again. The orientation of the own vehicle taken just before the own vehicle starts to turn right again, is different from that taken just before the own vehicle starts to turn right last time. Thus, the known driving assistance apparatus may not accurately determine whether there is an oncoming vehicle which is going to collide with the own vehicle turning right. As a result, the known driving assistance apparatus may alert the driver unnecessarily.

SUMMARY

An object of the invention is to provide a driving assistance apparatus, a driving assistance method, and a computer-readable storage medium storing driving assistance program which can avoid alerting the driver of the own vehicle unnecessarily.

According to the invention, a driving assistance apparatus comprises an electronic control unit. The electronic control unit executes a driving assistance control to alert a driver of an own vehicle for avoiding a collision of the own vehicle with an oncoming vehicle when the own vehicle performs a crossing movement. The crossing movement is a movement of the own vehicle to turn, crossing a line along which the oncoming vehicle moves. The electronic control unit is configured to detect and set the oncoming vehicle as an alert-target oncoming vehicle. Further, the electronic control unit is configured to execute the driving assistance control when determining that the own vehicle is going to collide with the alert-target oncoming vehicle after determining that the crossing movement of the own vehicle starts and before a predetermined after-crossing-start elapsing time elapses. Furthermore, the electronic control unit is configured to keep the driving assistance control unexecuted after the after-crossing-start elapsing time threshold elapses.

When the own vehicle is determined to be going to collide with the oncoming vehicle after a certain time elapses since the crossing movement of the own vehicle starts, the determination may be wrong. If the driving assistance control is executed when the determination is wrong, such an execution of the driving assistance control is an unnecessary one.

With the driving assistance apparatus according to the invention, the driving assistance control is not executed even when there is generated a situation that the own vehicle is determined to be going to collide with the alert-target oncoming vehicle after the after-crossing-start elapsing time threshold elapses since the crossing movement of the own vehicle is determined to start. Thus, the driving assistance control does not execute the unnecessary driving assistance control.

According to an aspect of the invention, the electronic control unit may be configured not to determine that the crossing movement of the own vehicle starts when (i) a crossing-movement driving operation for performing the crossing movement of the own vehicle is carried out, and (ii) a time elapsing since starting to execute the driving assistance control is smaller than a predetermined after-alerting elapsing time threshold.

In case that there are the oncoming vehicles approaching the own vehicle, just after the own vehicle starts the crossing movement, the own vehicle may stop the crossing movement and then start the crossing movement again. In this case, the oncoming vehicle is detected each time the crossing movement of the own vehicle starts. As a result, if alerting the driver in response to the oncoming vehicle being detected, the driver feels discomfort.

The driving assistance apparatus according to this aspect of the invention does not determine that the crossing movement of the own vehicle starts when the time elapsing since starting to execute the driving assistance control, is shorter than the after-alerting elapsing time threshold even when the crossing movement driving operation for performing the crossing movement of the own vehicle is carried out. As a result, the driving assistance apparatus does not execute the driving assistance control. Thus, the driver does not have a discomfort due to the unnecessary execution of the driving assistance control.

According to another aspect of the invention, the electronic control unit may be configured not to determine that the crossing movement of the own vehicle starts when (i) a crossing-movement driving operation for performing the crossing movement of the own vehicle is carried out, and (ii) a moving speed of the own vehicle is equal to or smaller than a predetermined speed threshold.

When the driver of the own vehicle knows the oncoming vehicle, the driver carrying out the crossing movement driving operation, probably slows down the own vehicle. In other words, when the moving speed of the own vehicle is small while the driver carries out the crossing movement driving operation, the driver probably knows the oncoming vehicle. If the driver is alerted when the driver knows the oncoming vehicle, the driver may have a discomfort.

The driving assistance apparatus according to this aspect of the invention does not determine that the own vehicle starts the crossing movement when the moving speed of the own vehicle is equal to or smaller than the predetermined speed threshold while the driver carries out the crossing movement driving operation. As a result, the driving assistance apparatus does not execute the driving assistance control. Thus, the driver does not have a discomfort due to the unnecessary execution of the driving assistance control.

According to further another aspect of the invention, the electronic control unit may be configured not to determine that the crossing movement of the own vehicle starts when (i) a crossing movement driving operation for performing the crossing movement of the own vehicle is carried out, and (ii) a braking driving operation for applying a braking force to the own vehicle is carried out.

When the driver of the own vehicle knows the oncoming vehicle, the driver carrying out the crossing movement driving operation, probably brakes the own vehicle. In other words, when the driver carries out the braking driving operation for applying the braking force to the own vehicle while the driver carries out the crossing movement driving operation, the driver probably knows the oncoming vehicle. If the driver is alerted when the driver knows the oncoming vehicle, the driver may have a discomfort.

The driving assistance apparatus according to this aspect of the invention does not determine that the own vehicle starts the crossing movement when the driver carries out the braking driving operation while the driver carries out the crossing movement driving operation. As a result, the driving assistance apparatus does not execute the driving assistance control. Thus, the driver does not have a discomfort due to the unnecessary execution of the driving assistance control.

According to further another aspect of the invention, the electronic control unit may be configured to set as the alert-target oncoming vehicle, a vehicle which is in a predetermined area ahead of the own vehicle and approaches the own vehicle.

The vehicle ahead of the own vehicle, approaching the own vehicle has a probability to collide with the own vehicle performing the crossing movement.

The driving assistance apparatus according to this aspect of the invention sets as the alert-target oncoming vehicle, the vehicle existing in the predetermined area ahead of the own vehicle and approaching the own vehicle. Thus, the driving assistance apparatus can set as the alert-target oncoming vehicle, the vehicle having the probability to collide with the own vehicle performing the crossing movement.

On the other hand, some of the vehicles existing ahead of the own vehicle and approaching the own vehicle may not have the probability to collide with the own vehicle performing the crossing movement. In this regard, such vehicles are detected only after a certain time elapses since the own vehicle starts the crossing movement.

The driving assistance apparatus according to this aspect of the invention does not execute the driving assistance control after the after-crossing-start elapsing time threshold elapses since determining that the own vehicle starts the crossing movement. Thus, the driver does not have a discomfort due to the unnecessary execution of the driving assistance control for the vehicle existing ahead of the own vehicle and approaching the own vehicle.

According to further another aspect of the invention, the electronic control unit may be configured to set as the alert-target oncoming vehicle, a vehicle which is in the predetermined area corresponding to a predetermined front right area ahead of the own vehicle on the right and approaches the own vehicle when determining that a right turn crossing movement of the own vehicle starts. The right turn crossing movement of the own vehicle is the crossing movement of the own vehicle to turn right, crossing the line along which the oncoming vehicle moves. Further, the electronic control unit may be configured to set as the alert-target oncoming vehicle, a vehicle which is in the predetermined area corresponding to a predetermined front left area ahead of the own vehicle on the left and approaches the own vehicle when determining that a left turn crossing movement of the own vehicle starts. The left turn crossing movement of the own vehicle is the crossing movement of the own vehicle to turn left, crossing the line along which the oncoming vehicle moves.

The vehicle existing ahead of the own vehicle on the right and approaching the own vehicle has a probability to collide with the own vehicle performing the right turn crossing movement. The vehicle existing ahead of the own vehicle on the left and approaching the own vehicle has a probability to collide with the own vehicle performing the left turn crossing movement.

The driving assistance apparatus according to this aspect of the invention sets as the alert-target oncoming vehicle, the vehicle existing in the predetermined front right area ahead of the own vehicle on the right and approaching the own vehicle when the own vehicle performs the right turn crossing movement. Thus, the driving assistance apparatus can set as the alert-target oncoming vehicle, the vehicle having a probability to collide with the own vehicle performing the right turn crossing movement. Similarly, the driving assistance apparatus according to this aspect of the invention sets as the alert-target oncoming vehicle, the vehicle existing in the predetermined front left area ahead of the own vehicle on the left and approaching the own vehicle when the own vehicle performs the left turn crossing movement. Thus, the driving assistance apparatus can set as the alert-target oncoming vehicle, the vehicle having a probability to collide with the own vehicle performing the left turn crossing movement.

On the other hand, some of the vehicles existing ahead of the own vehicle on the right and approaching the own vehicle may not have the probability to collide with the own vehicle performing the right turn crossing movement. In this regard, such vehicles are detected only after a certain time elapses since the own vehicle starts the right turn crossing movement. Similarly, some of the vehicles existing ahead of the own vehicle on the left and approaching the own vehicle may not have the probability to collide with the own vehicle performing the left turn crossing movement. In this regard, such vehicles are detected only after a certain time elapses since the own vehicle starts the left turn crossing movement.

The driving assistance apparatus according to this aspect of the invention does not execute the driving assistance control after the after-crossing-start elapsing time threshold elapses since determining that the own vehicle starts the right turn crossing movement or the left turn crossing movement. Thus, the driver does not have a discomfort due to the unnecessary execution of the driving assistance control for the vehicle existing ahead of the own vehicle on the right or left and approaching the own vehicle.

According to further another aspect of the invention, the after-crossing-start elapsing time threshold may be set to a time equal to or smaller than a time predictively taken for the own vehicle to reach the line since the crossing movement of the own vehicle starts.

After the own vehicle starts the crossing movement and reaches the line along which the oncoming vehicle move, the vehicle having no probability to collide with the own vehicle is likely to be realized as the oncoming vehicle. Thus, the own vehicle is likely to be wrongly determined to collide with the oncoming vehicle.

The driving assistance apparatus according to this aspect of the invention sets as the after-crossing-start elapsing time threshold, the time equal to or smaller than the time predictively taken for the own vehicle to reach the line along which the oncoming vehicle moves since the own vehicle starts the crossing movement. Thus, the driving assistance apparatus does not execute the driving assistance control when the own vehicle is likely to be wrongly determined to collide with the oncoming vehicle. Thus, the driver does not have a discomfort due to the unnecessary execution of the driving assistance control for the vehicle having no probability to collide with the own vehicle.

According to further another aspect of the invention, the after-crossing-start elapsing time threshold may be set to a time equal to or smaller than a time predictively taken for a steering angle of the own vehicle to reach a predetermined steering angle threshold since the crossing movement of the own vehicle starts.

When the steering angle of the own vehicle becomes equal to or greater than a certain angle after the own vehicle starts the crossing movement, the vehicle having no probability to collide with the own vehicle is likely to be realized as the oncoming vehicle. Thus, the own vehicle is likely to be wrongly determined to collide with the oncoming vehicle.

The driving assistance apparatus according to this aspect of the invention sets as the after-crossing-start elapsing time threshold, the time equal to or smaller than the time predictively taken for the steering angle of the own vehicle to reach the steering angle threshold since the own vehicle starts the crossing movement. Thus, the driving assistance apparatus does not execute the driving assistance control when the own vehicle is likely to be wrongly determined to collide with the oncoming vehicle. Thus, the driver does not have a discomfort due to the unnecessary execution of the driving assistance control for the vehicle having no probability to collide with the own vehicle.

According to the invention, a driving assistance method is a method for executing a driving assistance control to alert a driver of an own vehicle for avoiding a collision of the own vehicle with an oncoming vehicle when the own vehicle performs a crossing movement. The crossing movement is a movement of the own vehicle to turn, crossing a line along which the oncoming vehicle moves. The driving assistance method according to the invention comprises a step of detecting and setting the oncoming vehicle as an alert-target oncoming vehicle. Further, the driving assistance method according to the invention comprises a step of executing the driving assistance control when determining that the own vehicle is going to collide with the alert-target oncoming vehicle after determining that the crossing movement of the own vehicle starts and before a predetermined after-crossing-start elapsing time elapses. Furthermore, the driving assistance method according to the invention comprises a step of keeping the driving assistance control unexecuted after the after-crossing-start elapsing time threshold elapses.

With the driving assistance method according to the invention, the driving assistance control is not executed even when there is generated a situation that the own vehicle is determined to be going to collide with the alert-target oncoming vehicle after the after-crossing-start elapsing time threshold elapses since the crossing movement of the own vehicle is determined to start. Thus, the driving assistance control does not execute the unnecessary driving assistance control.

According to the invention, a computer-readable storage medium stores a driving assistance program which executes a driving assistance control to alert a driver of an own vehicle for avoiding a collision of the own vehicle with an oncoming vehicle when the own vehicle performs a crossing movement. The crossing movement is a movement of the own vehicle to turn, crossing a line along which the oncoming vehicle moves. The driving assistance program is configured to detect and set the oncoming vehicle as an alert-target oncoming vehicle. Further, the driving assistance program is configured to execute the driving assistance control when determining that the own vehicle is going to collide with the alert-target oncoming vehicle after determining that the crossing movement of the own vehicle starts and before a predetermined after-crossing-start elapsing time elapses. Furthermore, the driving assistance program is configured to keep the driving assistance control unexecuted after the after-crossing-start elapsing time threshold elapses.

With the driving assistance program stored in the computer readable storage medium according to the invention, the driving assistance control is not executed even when there is generated a situation that the own vehicle is determined to be going to collide with the alert-target oncoming vehicle after the after-crossing-start elapsing time threshold elapses since the crossing movement of the own vehicle is determined to start. Thus, the driving assistance control does not execute the unnecessary driving assistance control.

Elements of the invention are not limited to elements of embodiments and modified examples of the invention described with reference to the drawings. The other objects, features and accompanied advantages of the invention can be easily understood from the embodiments and the modified examples of the invention. Further, the invention can be applied to a vehicle which can be moved by a manual driving operation and an automatic driving operation.

BRIEF DESCRIPTION OF THE DRAWINGS

FIG. 4A is a view which shows one of types of the right turn crossing movement.

FIG. 4B is a view which shows another type of the right turn crossing movement.

FIG. 4C is a view which shows further another type of the right turn crossing movement.

DESCRIPTION OF THE EMBODIMENTS

Figure 1:
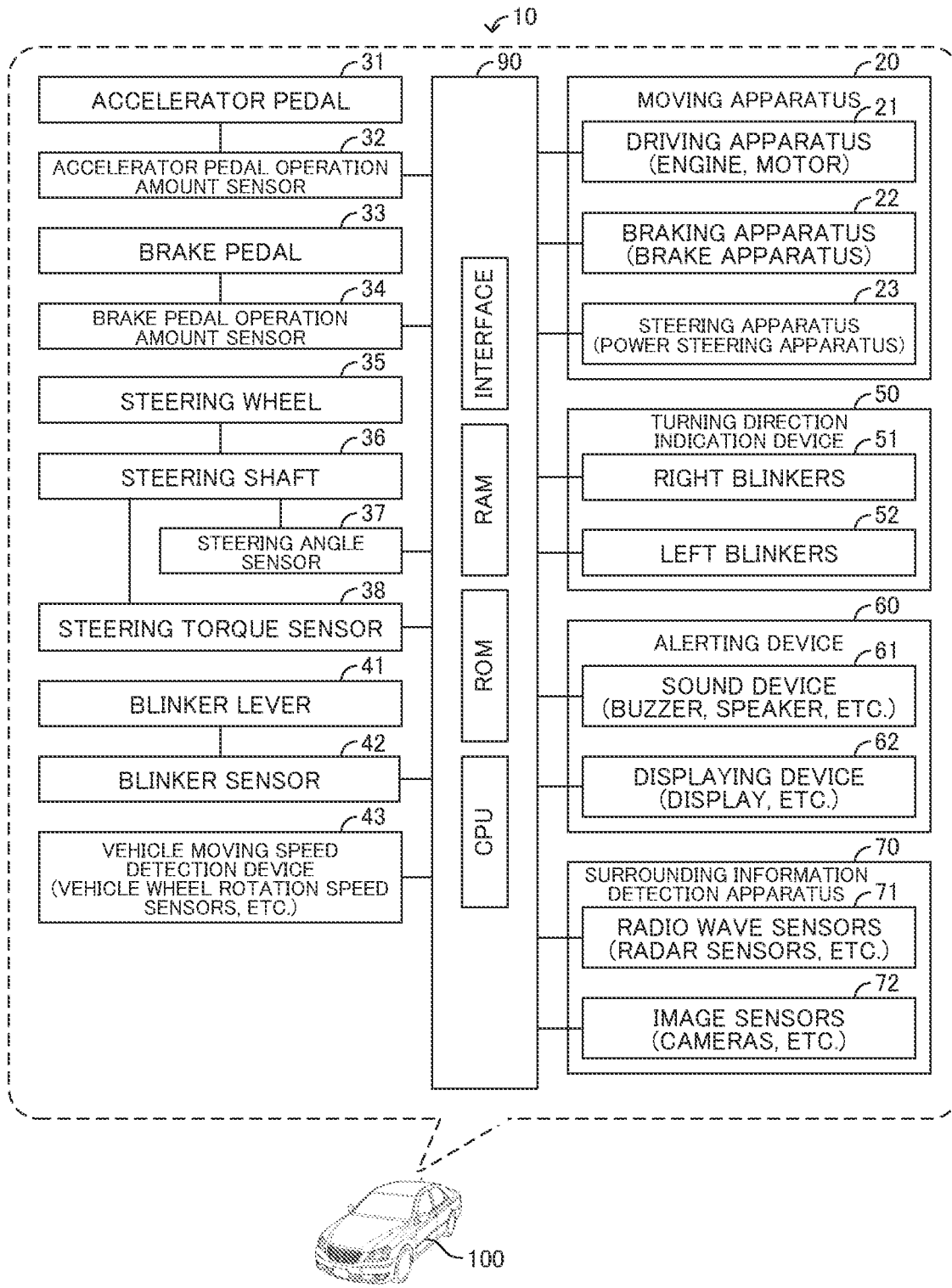
FIG. 1 is a view which shows a driving assistance apparatus according to an embodiment of the invention and an own vehicle installed with the driving assistance apparatus.

Below, a driving assistance apparatus, a driving assistance method, and a computer-readable storage medium storing driving assistance program according to an embodiment of the invention will be described with reference to the drawings. As shown in FIG. 1, the driving assistance apparatus 10 according to the embodiment of the invention is installed in an own vehicle 100.

<ECU>

The driving assistance apparatus 10 includes an ECU 90 as a control device. The ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, programs, or routines stored in the ROM.

<Moving Apparatus>

Further, a moving apparatus 20 is installed on the own vehicle 100. The moving apparatus 20 includes a driving apparatus 21, a braking apparatus 22, and a steering apparatus 23.

<Driving Apparatus>

The driving apparatus 21 is an apparatus which outputs a driving torque or a driving force to be applied to the own vehicle 100 to move the same. The driving apparatus 21 may include an internal combustion engine and/or at least one electric motor. The driving apparatus 21 is electrically connected to the ECU 90. The ECU 90 controls the driving torque output from the driving apparatus 21 by controlling operations of the driving apparatus 21.

<Braking Apparatus>

The braking apparatus 22 is an apparatus which outputs a braking torque or a braking force to be applied to the own vehicle 100 to brake the same. The braking apparatus 22 may be a brake apparatus. The braking apparatus 22 is electrically connected to the ECU 90. The ECU 90 controls the braking torque output from the braking apparatus 22 by controlling operations of the braking apparatus 22.

<Steering Apparatus>

The steering apparatus 23 is an apparatus which outputs a steering torque or a steering force to be applied to the own vehicle 100 to steer the same. The steering apparatus 23 may be a power steering apparatus. The steering apparatus 23 is electrically connected to the ECU 90. The ECU 90 controls the steering torque output from the steering apparatus 23 by controlling operations of the steering apparatus 23.

<Sensors, Etc.>

Further, an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a blinker lever 41, a blinker sensor 42, a vehicle moving speed detection device 43, a turning direction indication device 50, an alerting device 60, and a surrounding information detection apparatus 70 are installed on the own vehicle 100.

<Accelerator Pedal Operation Amount Sensor>

The accelerator pedal operation amount sensor 32 is a sensor which detects an operation amount of the accelerator pedal 31. The accelerator pedal operation amount sensor 32 is electrically connected to the ECU 90. The accelerator pedal operation amount sensor 32 sends information on the detected operation amount of the accelerator pedal 31 to the ECU 90. The ECU 90 acquires the operation amount of the accelerator pedal 31 as an accelerator pedal operation amount AP, based on the information sent from the accelerator pedal operation amount sensor 32. The ECU 90 acquires a requested driving torque or a requested driving force, based on the accelerator pedal operation amount AP and a moving speed of the own vehicle 100. The ECU 90 controls the operations of the driving apparatus 21 to apply the driving torque corresponding to the requested driving torque to the own vehicle 100, in particular, driven wheels of the own vehicle 100 by the driving apparatus 21.

<Brake Pedal Operation Amount Sensor>

The brake pedal operation amount sensor 34 is a sensor which detects an operation amount of the brake pedal 33. The brake pedal operation amount sensor 34 is electrically connected to the ECU 90. The brake pedal operation amount sensor 34 sends information on the detected operation amount of the brake pedal 33 to the ECU 90. The ECU 90 acquires the operation amount of the brake pedal 33 as a brake pedal operation amount BP, based on the information sent from the brake pedal operation amount sensor 34. The ECU 90 acquires a requested braking torque or a requested braking force, based on the brake pedal operation amount BP. The ECU 90 controls the operations of the braking apparatus 22 to apply the braking torque corresponding to the requested braking torque to the own vehicle 100, in particular, vehicle wheels of the own vehicle 100 by the braking apparatus 22.

<Steering Angle Sensor>

The steering angle sensor 37 is a sensor which detects a rotation angle of the steering shaft 36 with respect to its neutral position. The steering angle sensor 37 is electrically connected to the ECU 90. The steering angle sensor 37 sends information on the detected rotation angle of the steering shaft 36 to the ECU 90. The ECU 90 acquires the rotation angle of the steering shaft 36 as a steering angle θ, based on the information sent from the steering angle sensor 37.

<Steering Torque Sensor>

The steering torque sensor 38 is a sensor which detects a torque input to the steering shaft 36 by the driver via the steering wheel 35. The steering torque sensor 38 is electrically connected to the ECU 90. The steering torque sensor 38 sends information on the detected torque to the ECU 90. The ECU 90 acquires the torque input to the steering shaft 36 by the driver via the steering wheel 35 as a driver input torque, based on the information sent from the steering torque sensor 38.

The ECU 90 acquires a requested steering torque or a requested steering force, based on the steering angle θ, the driver input torque, and the moving speed of the own vehicle 100. The ECU 90 controls the operations of the steering apparatus 23 to apply the steering torque corresponding to the requested steering torque to the own vehicle 100, in particular, steered wheels of the own vehicle 100 by the steering apparatus 23.

<Blinker Sensor>

The blinker sensor 42 is a sensor which detects a set position of the blinker lever 41. The blinker sensor 42 is electrically connected to the ECU 90. The blinker lever 41 is a device operated by the driver of the own vehicle 100. The driver can set the blinker lever 41 at any one of a right blinker operation position (or a right turning indication position) and a left blinker operation position (or a left turning indication position). The blinker sensor 42 sends information on the detected set position of the blinker lever 41 to the ECU 90. The ECU 90 acquires or detects the set position of the blinker lever 41, based on the information sent from the blinker sensor 42.

<Vehicle Moving Speed Detection Device>

The vehicle moving speed detection device 43 is a device which detects the moving speed of the own vehicle 100. The vehicle moving speed detection device 43 may include vehicle wheel rotation speed sensors. The vehicle moving speed detection device 43 is electrically connected to the ECU 90. The vehicle moving speed detection device 43 sends information on the detected moving speed of the own vehicle 100 to the ECU 90. The ECU 90 acquires the moving speed of the own vehicle 100 as an own vehicle moving speed V1, based on the information sent from the vehicle moving speed detection device 43.

<Turning Direction Indication Device>

The turning direction indication device 50 is a device which informs persons outside of the own vehicle 100 of a turning direction of the own vehicle 100. In this embodiment, the turning direction indication device 50 includes right blinkers 51 and left blinkers 52. The right blinkers 51 and the left blinkers 52 are electrically connected to the ECU 90. The ECU 90 blinks the right blinkers 51 when the blinker lever 41 is set at the right blinker operation position or the right turning indication position. On the other hand, when the blinker lever 41 is set at the left blinker operation position or the left turning indication position, the ECU 90 blinks the left blinkers 52.

<Alerting Device>

The alerting device 60 is a device which performs various notifications to the driver. In this embodiment, the alerting device 60 includes a sound device 61 and a displaying device 62. The displaying device 62 may be a display which displays various images. The sound device 61 may be a buzzer which outputs various alerting sounds and/or a speaker which outputs various announcements.

<Sound Device>

The sound device 61 is electrically connected to the ECU 90. The ECU 90 outputs various alerting sounds and/or various announcements from the sound device 61.

<Displaying Device>

The displaying device 62 is electrically connected to the ECU 90. The ECU 90 displays various images on the displaying device 62.

<Surrounding Information Detection Apparatus>

The surrounding information detection apparatus 70 is an apparatus which detects information around the own vehicle 100. In this embodiment, the surrounding information detection apparatus 70 includes radio wave sensors 71 and image sensors 72. The radio wave sensor 71 may be a radar sensor such as a millimeter wave radar. The image sensor 72 may be a camera. The surrounding information detection apparatus 70 may include sound wave sensors such as ultrasonic wave sensors such as clearance sonars and/or optical sensors such as laser radars such as LiDARs.

<Radio Wave Sensors>

The radio wave sensors 71 are electrically connected to the ECU 90. The radio wave sensor 71 transmits radio waves and receives reflected waves, i.e., the radio waves reflected on objects. The radio wave sensor 71 sends information on detection results, i.e., the transmitted radio waves and the received reflected waves to the ECU 90. In other words, the radio wave sensor 71 detects objects around the own vehicle 100 and send the detection results, i.e., information on the detected objects to the ECU 90. The ECU 90 acquires the information on the objects around the own vehicle 100 as surrounding detection information IS, based on the information or radio wave information sent from the radio wave sensors 71. In this embodiment, the objects may be vehicles, motorbikes, bicycles, and persons.

<Image Sensors>

The image sensors 72 are electrically connected to the ECU 90. The image sensor 72 takes images of a view around the own vehicle 100 and sends information on the taken images or camera images to the ECU 90. The ECU 90 acquires the information on situations around the own vehicle 100 as the surrounding detection information IS, based on the information or taken image information or camera image information sent from the image sensors 72.

<Summary of Operations of Driving Assistance Apparatus>

Next, a summary of operations of the driving assistance apparatus 10 will be described. The driving assistance apparatus 10 executes a driving assistance control to alert the driver of the own vehicle 100 for avoiding a collision of the own vehicle 100 with an oncoming vehicle 200 when the own vehicle 100 performs a crossing movement. The crossing movement is a movement of the own vehicle 100 to turn, crossing an oncoming vehicle moving line. The oncoming vehicle moving line is a line along which the oncoming vehicle 200 is predicted to move.

Figure 2:
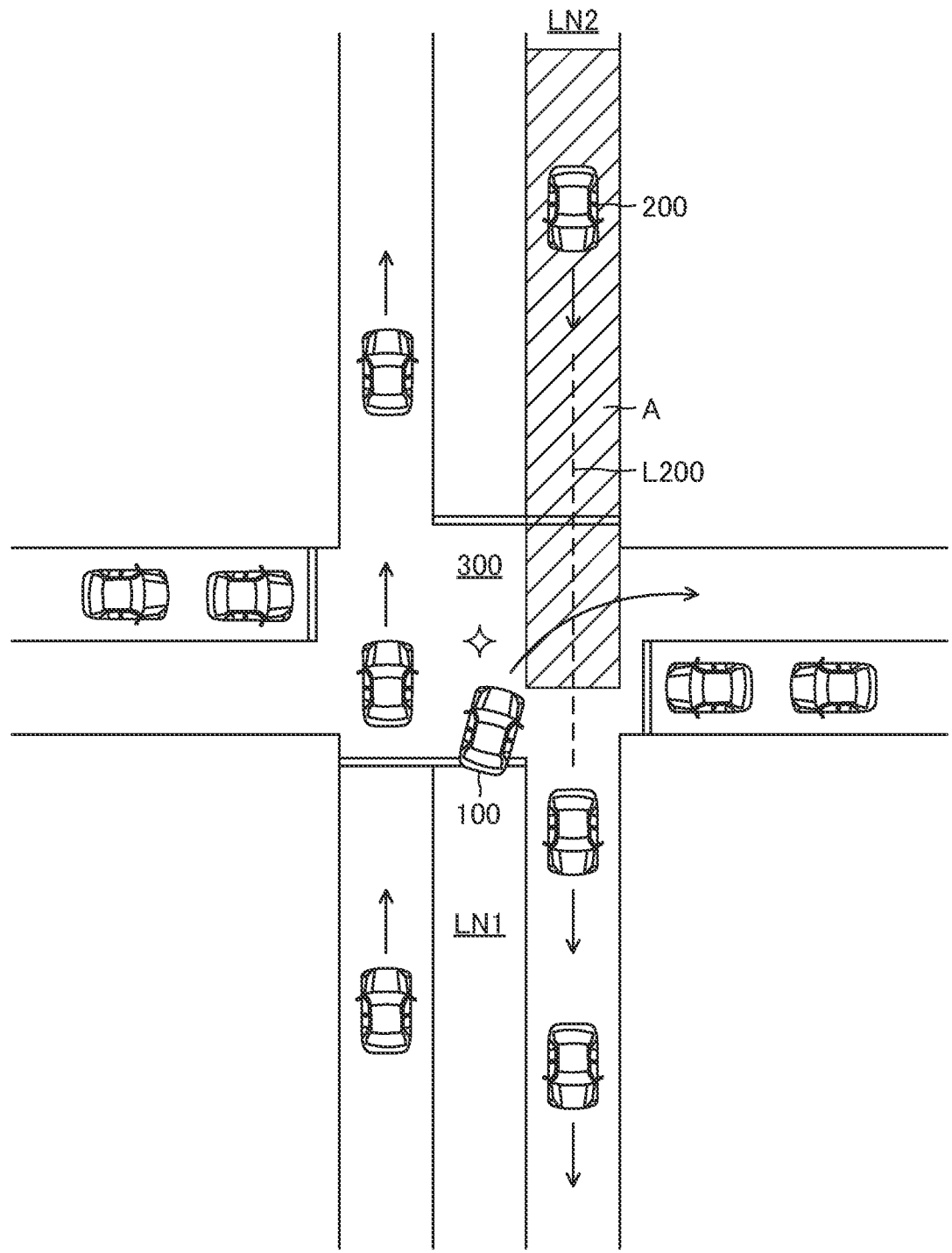
FIG. 2 is a view which shows a scene that the own vehicle performs a right turn crossing movement.

In particular, as shown in FIG. 2, the driving assistance apparatus 10 executes the driving assistance control to alert the driver of the own vehicle 100 for avoiding the collision of the own vehicle 100 with the oncoming vehicle 200 when the own vehicle 100 performs a right turn crossing movement. The right turn crossing movement is a movement of the own vehicle 100 to turn right, crossing the oncoming vehicle moving line L200. The oncoming vehicle moving line L200 is a line along which the oncoming vehicle 200 is predicted to move through a traffic intersection 300.

Figure 3:
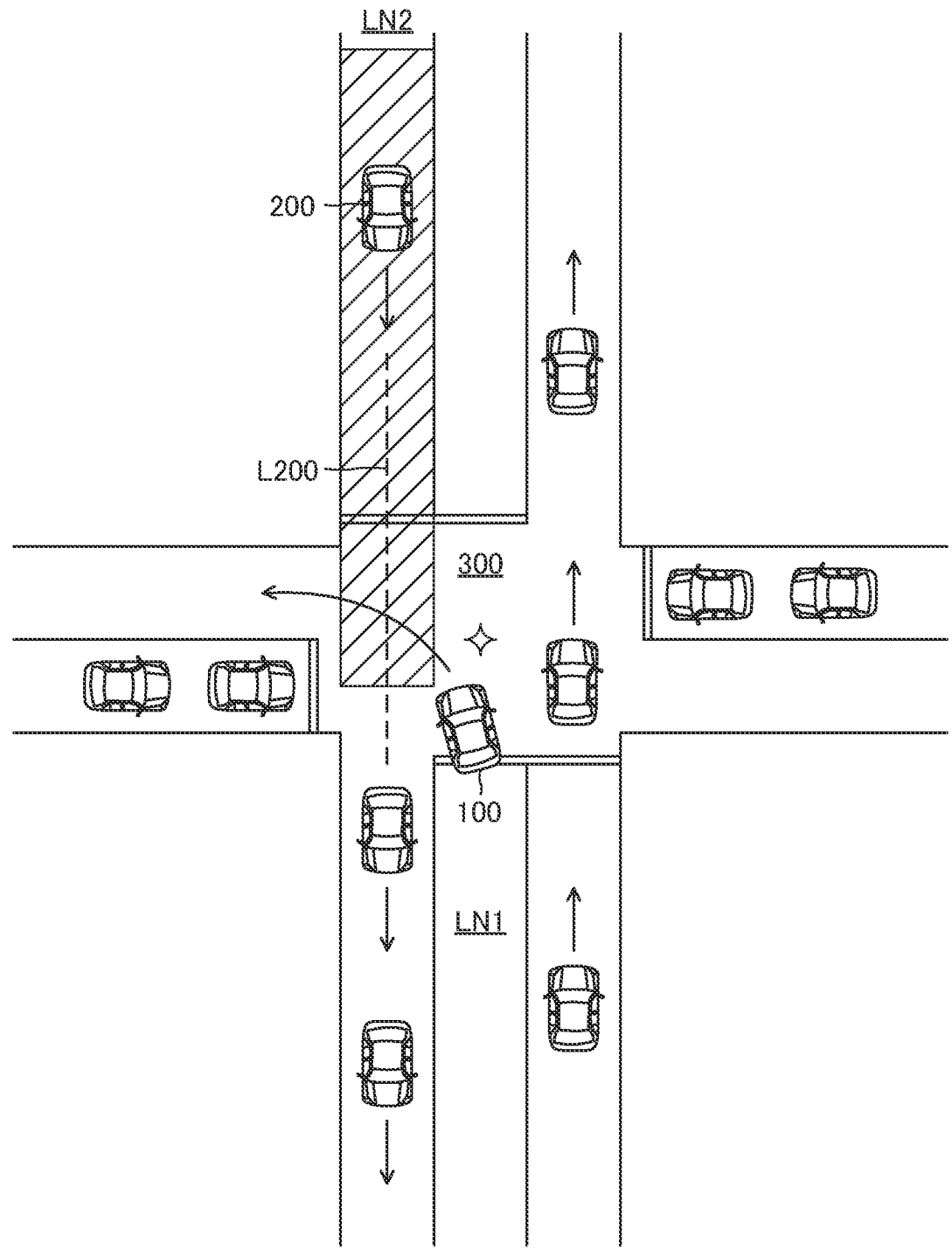
FIG. 3 is a view which shows a scene that the own vehicle performs a left turn crossing movement.

Similarly, as shown in FIG. 3, the driving assistance apparatus 10 executes the driving assistance control to alert the driver of the own vehicle 100 for avoiding the collision of the own vehicle 100 with the oncoming vehicle 200 when the own vehicle 100 performs a left turn crossing movement. The left turn crossing movement is a movement of the own vehicle 100 to turn left, crossing the oncoming vehicle moving line L200.

In this embodiment, the right turn crossing movement includes (i) a movement of the own vehicle 100 shown in FIG. 4A to turn right, crossing the oncoming vehicle moving line L200 from a road 301 on which the own vehicle 100 moves to a road 303 extending orthogonally to the road 301, (ii) a movement of the own vehicle 100 shown in FIG. 4B to turn right, crossing the oncoming vehicle moving line L200 from the road 301 on which the own vehicle 100 moves to a road 304 extending obliquely to the road 301, and (iii) a movement of the own vehicle 100 shown in FIG. 4C to turn right, crossing the oncoming vehicle moving line L200 from the road 301 on which the own vehicle 100 moves to a road 305 extending obliquely to the road 301.

Figure 5A:
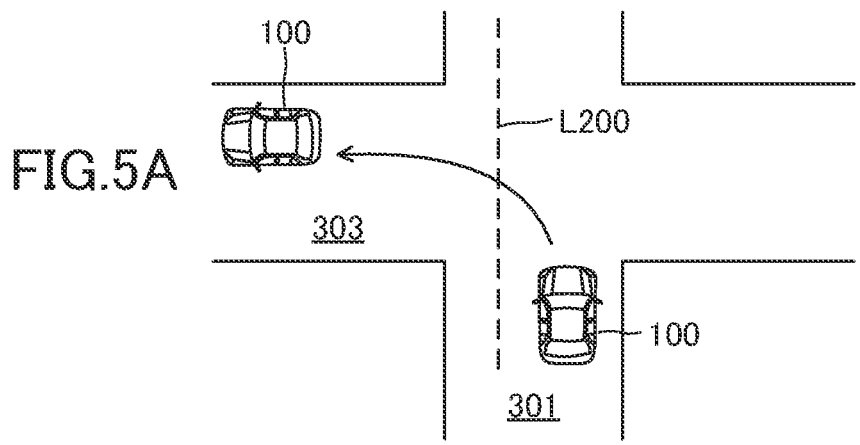
FIG. 5A is a view which shows one of types of the left turn crossing movement.
Figure 5B:
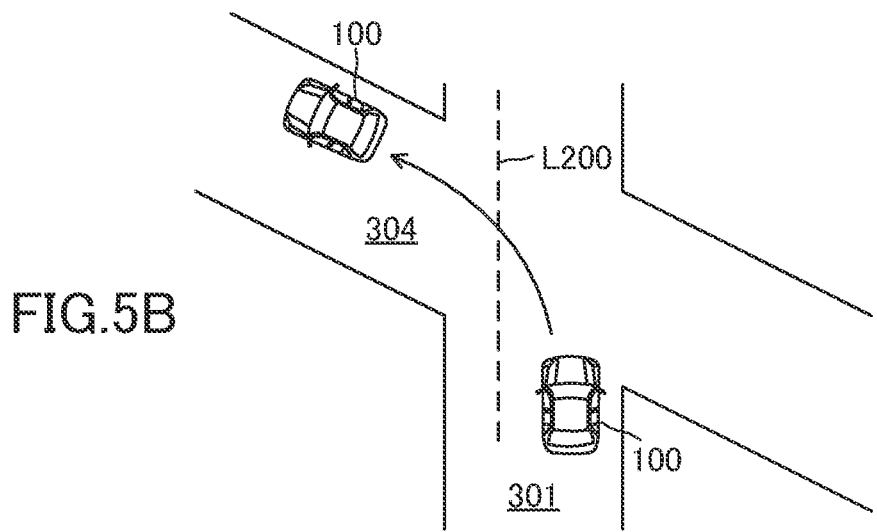
FIG. 5B is a view which shows another type of the left turn crossing movement.
Figure 5C:
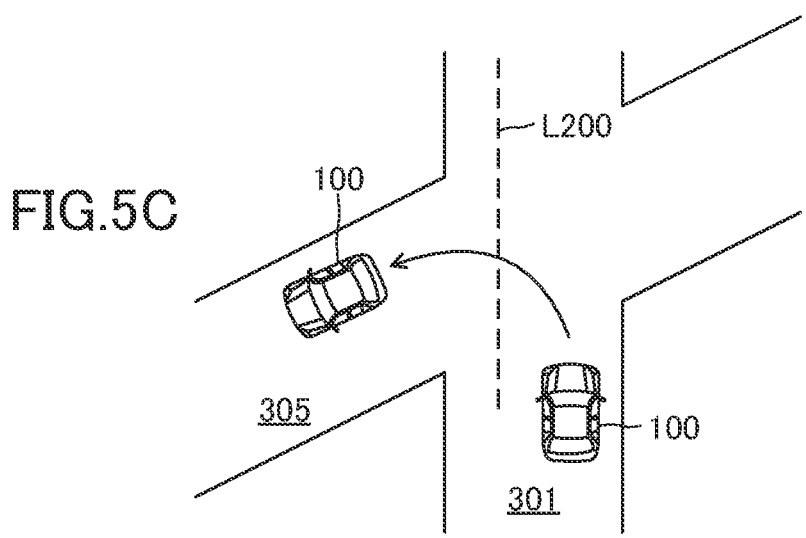
FIG. 5C is a view which shows further another type of the left turn crossing movement.

Similarly, in this embodiment, the left turn crossing movement includes (i) a movement of the own vehicle 100 shown in FIG. 5A to turn left, crossing the oncoming vehicle moving line L200 from the road 301 on which the own vehicle 100 moves to a road 306 extending orthogonally to the road 301, (ii) a movement of the own vehicle 100 shown in FIG. 5B to turn left, crossing the oncoming vehicle moving line L200 from the road 301 on which the own vehicle 100 moves to a road 307 extending obliquely to the road 301, and (iii) a movement of the own vehicle 100 shown in FIG. 5C to turn left, crossing the oncoming vehicle moving line L200 from the road 301 on which the own vehicle 100 moves to a road 308 extending obliquely to the road 301.

Further, in this embodiment, as shown in FIG. 2, the oncoming vehicle 200 is a vehicle which moves in an oncoming lane LN2 in a direction opposite to the moving direction of the own vehicle 100, approaching the own vehicle 100. The oncoming lane LN2 shown in FIG. 2 is a traffic lane on the right side of an own lane LN1. The own lane LN1 is a traffic lane in which the own vehicle 100 moves. Alternatively, as shown in FIG. 3, the oncoming vehicle 200 is a vehicle which moves in the oncoming lane LN2 in the direction opposite to the moving direction of the own vehicle 100, approaching the own vehicle 100. The oncoming lane LN2 shown in FIG. 3 is a traffic lane on the left side of an own lane LN1.

In this embodiment, the driving assistance apparatus 10 detects the oncoming vehicle 200, based on the surrounding detection information IS.

While the own vehicle 100 moves, the driving assistance apparatus 10 executes a process to determine whether the own vehicle 100 starts to perform the crossing movement. In this embodiment, when a first condition becomes satisfied, the driving assistance apparatus 10 determines that the own vehicle 100 starts to perform the crossing movement.

The first condition may be a steering condition that (i) a steering angle rate $d\theta$ becomes equal to or greater than a predetermined value, i.e., a steering angle rate threshold $d\theta th$, and (ii) the steering angle $\theta$ of the own vehicle 100 becomes equal to or greater than a predetermined value, i.e., a steering angle threshold $\theta th$. The steering angle rate $d\theta$ is a change speed of the steering angle $\theta$ of the own vehicle 100. However, in case that the own vehicle 100 stops or moves at a relatively low speed when the steering condition becomes satisfied, the driver of the own vehicle 100 probably notices the oncoming vehicle 200 and stops the own vehicle 100 or moves the own vehicle 100 at the relatively low speed. In this case, if the driver is alerted, the driver may feel bothersome. Thus, the first condition preferably includes a vehicle moving speed condition that the own vehicle moving speed V1 is equal to or greater than a constant vehicle moving speed.

Further, in case that the first condition is designed to become satisfied when the steering condition becomes satisfied, or in case that the first condition is designed to become satisfied when the vehicle moving speed condition becomes satisfied, if there are the consecutive oncoming vehicles 200, the first condition becomes satisfied several times for a short time. As a result, the driver is alerted several times. Thus, the driver may feel bothersome. Therefore, the first condition preferably includes a time condition that a constant time has elapsed since the driver is alerted last time.

Accordingly, in this embodiment, the first condition is a condition that (i) the steering angle rate $d\theta$ becomes equal to or greater than the steering angle rate threshold $d\theta th$, (ii) the steering angle $\theta$ becomes equal to or greater than the steering angle threshold $\theta th$, (iii) the own vehicle moving speed V1 is equal to or greater than a predetermined vehicle moving speed, i.e., a predetermined speed threshold or an own vehicle moving speed threshold Vth, and (iv) a time elapsing since the driver is alerted last time, a post-alerting elapsing time or a first elapsing time T1, is equal to or greater than a predetermine time, i.e., a post-alerting elapsing time threshold or a first elapsing time threshold T1th.

The first condition may be a condition that (i) the steering angle rate $d\theta$ becomes equal to or greater than the steering angle rate threshold $d\theta th$, and (ii) the steering angle $\theta$ becomes equal to or greater than the steering angle threshold $\theta th$. That is, the first condition may be a condition that a driving operation to the own vehicle 100 to perform the crossing movement of the own vehicle 100 is performed. In this case, the driving assistance apparatus 10 may be configured not to determine that the own vehicle 100 starts performing the crossing movement when (i) the first condition becomes satisfied, and (ii) the own vehicle moving speed V1 is smaller than the own vehicle moving speed threshold Vth, or when (i) the first condition becomes satisfied, and (ii) the first elapsing time T1 is shorter than the first elapsing time threshold T1th. Alternatively, the driving assistance apparatus 10 may be configured not to perform the process to determine whether the first condition becomes satisfied when (i) the first condition becomes satisfied, and (ii) the own vehicle moving speed V1 is smaller than the own vehicle moving speed threshold Vth, or when (i) the first condition becomes satisfied, and (ii) the first elapsing time T1 is shorter than the first elapsing time threshold T1th.

Further, the first condition may be a condition that (i) the steering angle rate $d\theta$ becomes equal to or greater than the steering angle rate threshold $d\theta th$, (ii) the steering angle $\theta$ becomes equal to or greater than the steering angle threshold $\theta th$, and (iii) the own vehicle moving speed V1 is equal to or greater than a predetermined vehicle moving speed, i.e., the own vehicle moving speed threshold Vth. In this case, the driving assistance apparatus 10 may be configured not to determine that the own vehicle 100 starts performing the crossing movement when (i) the first condition becomes satisfied, and (ii) the first elapsing time T1 is shorter than the first elapsing time threshold T1th. Alternatively, the driving assistance apparatus 10 may be configured not to execute the process to determine whether the first condition becomes satisfied when the first elapsing time T1 is shorter than the first elapsing time threshold T1th.

Further, the first condition may be a condition that (i) the steering angle rate $d\theta$ becomes equal to or greater than the steering angle rate threshold $d\theta th$, (ii) the steering angle $\theta$ becomes equal to or greater than the steering angle threshold $\theta th$, and (iii) the first elapsing time T1, i.e., the time elapsing since alerting the driver last time, is equal to or greater than the first elapsing time threshold T1th. In this case, the driving assistance apparatus 10 may be configured not to determine that the own vehicle 100 starts performing the crossing movement when (i) the first condition becomes satisfied, and (ii) the own vehicle moving speed V1 is smaller than the own vehicle moving speed threshold Vth. Alternatively, the driving assistance apparatus 10 may be configured not to execute the process to determine whether the first condition becomes satisfied when the own vehicle moving speed V1 is smaller than the own vehicle moving speed threshold Vth.

It should be noted that the steering angle rate threshold $d\theta th$ is set to a value greater than zero, and the steering angle threshold $\theta th$ is set to a value greater than zero. In particular, in this embodiment, the steering angle rate threshold $d\theta th$ and the steering angle threshold θth are set such that (i) the steering angle rate dθ becomes equal to or greater than the steering angle rate dθth, and (ii) the steering angle θ becomes equal to or greater than the steering angle threshold θth just after the own vehicle 100 starts turning to perform the crossing movement.

The own vehicle moving speed threshold Vth is set to a value greater than zero. In particular, in this embodiment, the own vehicle moving speed threshold Vth is set to a minimum value of the own vehicle moving speed V1 which can be realized by the driver who does not notice the oncoming vehicle 200 which is going to collide with the own vehicle 100.

The first elapsing time threshold T1th is set such that the driver is alerted once after the own vehicle 100 starts the crossing movement and before the own vehicle 100 finishes the crossing movement.

Further, the first condition may include a condition that the brake pedal 33 is not operated, that is, a condition that the brake pedal operation amount BP is zero.

Further, the first condition may include (i) a condition that the steering wheel 35 is rotated clockwise (or in a rightward direction), and the blinker lever 41 is positioned at the right blinker operation position (or the right turn indication position), i.e., a condition that the steering wheel 35 is rotated clockwise (or in the rightward direction), and the right blinkers 51 are activated or blinked, and (ii) a condition that the steering wheel 35 is rotated counterclockwise (or in a leftward direction), and the blinker lever 41 is positioned at the left blinker operation position (or the left turn indication position), i.e., a condition that the steering wheel 35 is rotated counterclockwise (or in the leftward direction), and the left blinkers 52 are activated or blinked.

When the driving assistance apparatus 10 determines that the own vehicle 100 starts performing the crossing movement, the driving assistance apparatus 10 repeatedly executes a process to determine whether there is the alert-target oncoming vehicle 200, i.e., the oncoming vehicle 200 to be a target for alerting the driver by the driving assist control, that is, a process to determine whether the alert-target oncoming vehicle 200 is detected. In this embodiment, when a second condition becomes satisfied, the driving assistance apparatus 10 determines that there is the alert-target oncoming vehicle 200.

The second condition is a condition that (i) the detected oncoming vehicle 200 is in a predetermined area A, (ii) a moving speed V2 of the detected oncoming vehicle 200 is within a predetermined range, i.e., a predetermined speed range R2, and (iii) there are not lane markings such as white lines between the own vehicle 100 and the detected oncoming vehicle 200. In this regard, the second condition may not include the condition that there are not lane markings such as white lines between the own vehicle 100 and the detected oncoming vehicle 200.

As shown in FIG. 2 and FIG. 3, the predetermined area A is an area ahead of the own vehicle 100 and having (i) a longitudinal distance Dx within a predetermined range, i.e., a predetermined longitudinal distance range Rx and (ii) a lateral distance Dy within a predetermined range, i.e., a predetermined lateral distance range Ry.

In particular, the predetermined area includes (i) an area ahead of the own vehicle 100 on the right and having the longitudinal distance Dx within the predetermined longitudinal distance range Rx and the lateral distance Dy within the predetermined lateral distance range Ry and (ii) an area ahead of the own vehicle 100 on the left and having the longitudinal distance Dx within the predetermined longitudinal distance range Rx and the lateral distance Dy within the predetermined lateral distance range Ry.

Thus, when the driving assistance apparatus 10 determines that (i) the own vehicle 100 starts performing the right turn crossing movement, i.e., the movement of the own vehicle 100 to turn right, crossing the oncoming vehicle moving line L200, i.e., the line along which the detected oncoming vehicle 200 predictively moves, (ii) the detected oncoming vehicle 200 is in the predetermined area A ahead of the own vehicle 100 on the right, and (iii) the detected oncoming vehicle 200 approaches the own vehicle 100, the driving assistance apparatus 10 determines that the second condition becomes satisfied and sets the detected oncoming vehicle 200 as the alert-target oncoming vehicle.

Also, when the driving assistance apparatus 10 determines that (i) the own vehicle 100 starts performing the left turn crossing movement, i.e., the movement of the own vehicle 100 to turn left, crossing the oncoming vehicle moving line L200, i.e., the line along which the detected oncoming vehicle 200 predictively moves, (ii) the detected oncoming vehicle 200 is in the predetermined area A ahead of the own vehicle 100 on the left, and (iii) the detected oncoming vehicle 200 approaches the own vehicle 100, the driving assistance apparatus 10 determines that the second condition becomes satisfied and sets the detected oncoming vehicle 200 as the alert-target oncoming vehicle.

Figure 6A:
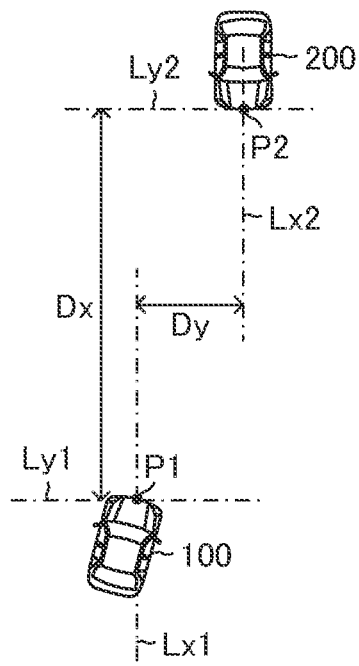
FIG. 6A is a view which shows a longitudinal distance, etc.
Figure 7A:
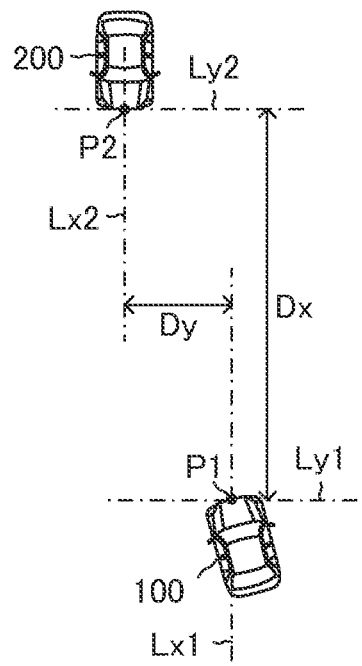
FIG. 7A is a view which shows the longitudinal distance, etc.

As shown in FIG. 6A and FIG. 7A, the longitudinal distance Dx is a distance between a first lateral line Ly1 and a second lateral line Ly2. The first lateral line Ly1 is a line which horizontally extends perpendicularly to the moving direction of the oncoming vehicle 200 through an own vehicle reference point P1. The second lateral line Ly2 is a line which extends parallel to the first lateral line Ly1 through an oncoming vehicle reference point P2. The oncoming vehicle reference point P2 is a particular reference point on the oncoming vehicle 200. In this embodiment, the oncoming vehicle reference point P2 is a center point on a front end of the oncoming vehicle 200 in a width direction of the oncoming vehicle 200.

As shown in FIG. 6A and FIG. 7A, the lateral distance Dy is a distance between a first longitudinal line Lx1 and a second longitudinal line Lx2. The first longitudinal line Lx1 is a line which horizontally extends perpendicularly to the first lateral line Ly1 through the own vehicle reference point P1. The second longitudinal line Lx2 is a line which horizontally extends parallel to the second lateral line Ly2 through the oncoming vehicle reference point P2. In other words, the second longitudinal line Lx2 is a line which extends parallel to the first longitudinal line Lx1 through the oncoming vehicle reference point P2.

The driving assistance apparatus 10 acquires a relative position Pr of the oncoming vehicle 200 to the own vehicle reference point P1, based on the surrounding detection information IS. Then, the driving assistance apparatus 10 acquires the longitudinal distance Dx and the lateral distance Dy by using the relative position Pr. It should be noted that the own vehicle reference point P1 is a particular reference point of the own vehicle 100. In this embodiment, the own vehicle reference point P1 is a center point on a front end of the own vehicle 100 in a width direction of the own vehicle 100.

As described above, in this embodiment, the alert-target oncoming vehicle 200 is the oncoming vehicle 200 in the predetermined area ahead of the own vehicle 100. That is, the alert-target oncoming vehicle 200 is a vehicle which is in the predetermined area ahead of the own vehicle 100 and approaches the own vehicle 100.

When the driving assistance apparatus 10 determines that there is the alert-target oncoming vehicle 200, the driving assistance apparatus 10 determines whether the own vehicle 100 is going to collide with the alert-target oncoming vehicle 200. When a predicted reaching time TTC for the alert-target oncoming vehicle 200 decreases to a predetermined time, i.e., a predicted reaching time threshold TTCth, the driving assistance apparatus 10 determines that the own vehicle 100 is going to collide with the alert-target oncoming vehicle 200.

The predicted reaching time TTC is a time which the alert-target oncoming vehicle 200 predictively takes to reach the own vehicle 100. In this embodiment, the predicted reaching time TTC is acquired by dividing the longitudinal distance Dx by a relative speed Vr between the own vehicle 100 and the alert-target oncoming vehicle 200 (TTC=Dx/Vr). The own vehicle 100 calculates and acquires the relative speed Vr by subtracting the own vehicle moving speed V1 from the moving speed V2 of the alert-target oncoming vehicle 200.

It should be noted that the predicted reaching time threshold TTCth is set to a value greater than zero. In particular, in this embodiment, the predicted reaching time threshold TTCth is set to a relatively great value which activates alerting the driver just after the own vehicle 100 starts performing the crossing movement.

It should be noted that the driving assistance apparatus 10 may be configured to determine whether the own vehicle 100 is going to collide with the alert-target oncoming vehicle 200 by using a collision index value C in place of the predicted reaching time TTC. The collision index value C is a value which decreases as a ratio of the longitudinal distance Dx relative to the lateral distance Dy decreases. The driving assistance apparatus 10 acquires the collision index value C as described below.

Figure 6B:
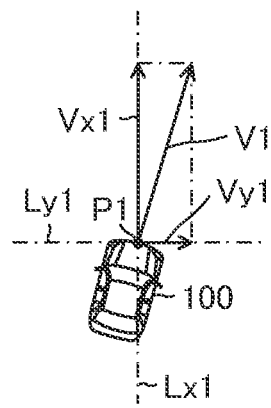
FIG. 6B is a view which shows a longitudinal component of a moving speed of the own vehicle.
Figure 7B:
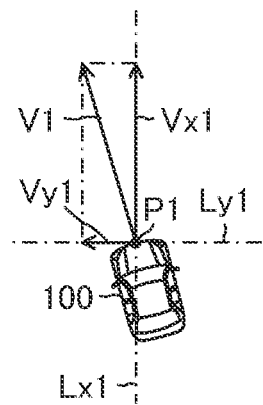
FIG. 7B is a view which shows the longitudinal component of the moving speed of the own vehicle.

The driving assistance apparatus 10 acquires the longitudinal distance Dx and the lateral distance Dy as well as a longitudinal component Vx1 of the own vehicle moving speed V1. As shown in FIG. 6B and FIG. 7B, the longitudinal component Vx1 is a component of the own vehicle moving speed V1 in a direction along the first longitudinal line Lx1.

Figure 6C:
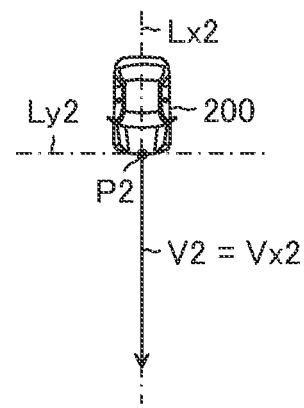
FIG. 6C is a view which shows a longitudinal component of a moving speed of an oncoming vehicle.
Figure 7C:
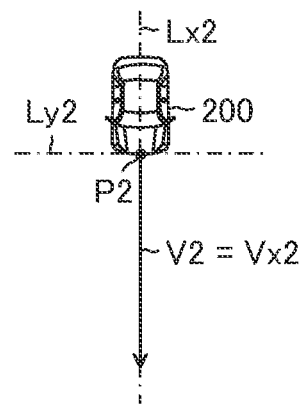
FIG. 7C is a view which shows the longitudinal component of the moving speed of the oncoming vehicle, etc.

In addition, the driving assistance apparatus 10 acquires a longitudinal component Vx2 of the moving speed V2 of the alert-target oncoming vehicle 200. As shown in FIG. 6C and FIG. 7C, the longitudinal component Vx2 is a component of the moving speed V2 in a direction along the second longitudinal line Lx2. In examples shown in FIG. 6C and FIG. 7C, the moving direction of the alert-target oncoming vehicle 200 is parallel to the direction along the second longitudinal line Lx2. Thus, the longitudinal component Vx2 is equal to the moving speed V2.

The driving assistance apparatus 10 acquires a longitudinal relative speed Vrx by adding the longitudinal component Vx2 of the moving speed V2 of the alert-target oncoming vehicle 200 to the longitudinal component Vx1 of the own vehicle moving speed V1. The longitudinal relative speed Vrx is a relative speed between the own vehicle 100 and the alert-target oncoming vehicle 200 in the direction along the first longitudinal line Lx1.

In addition, the driving assistance apparatus 10 acquires a longitudinal reaching predicted time TTCx by dividing the longitudinal distance Dx by the longitudinal relative speed Vrx (TTCx=Dx/Vrx).

In addition, the driving assistance apparatus 10 acquires a lateral component Vy1 of the own vehicle moving speed V1. As shown in FIG. 6B and FIG. 7B, the lateral component Vy1 of the own vehicle moving speed V1 is a component of the own vehicle moving speed V1 in a direction along the first lateral line Ly1. In this embodiment, the lateral component Vy1 of the own vehicle moving speed V1 acquired while the own vehicle 100 turns right, is positive, and the lateral component Vy1 of the own vehicle moving speed V1 acquired while the own vehicle 100 turns left, is negative.

In addition, the driving assistance apparatus 10 acquires the moving speed V2 of the alert-target oncoming vehicle, based on the millimeter wave date and the image data. Then, the driving assistance apparatus 10 acquires a lateral component Vy2 of the moving speed V2. The lateral component Vy2 is a component of the moving speed V2 in a direction along the second lateral line Ly2. In examples shown in FIG. 6C and FIG. 7C, the moving direction of the alert-target oncoming vehicle 200 is parallel to the direction along the second longitudinal line Lx2. Thus, the lateral component Vy2 of the moving speed V2 of the alert-target oncoming vehicle 200 is zero. In this embodiment, the lateral component Vy2 acquired while the alert-target oncoming vehicle 200 turns right, is positive, and the lateral component Vy2 acquired while the alert-target oncoming vehicle 200 turns left, is negative.

The driving assistance apparatus 10 acquires a lateral relative speed Vry by adding the lateral component Vy2 of the moving speed V2 of the alert-target oncoming vehicle 200 to the lateral component Vy1 of the own vehicle moving speed V1. The lateral relative speed Vry is a relative speed between the own vehicle 100 and the alert-target oncoming vehicle 200 in the direction along the first lateral line Ly1.

In addition, the driving assistance apparatus 10 acquires a lateral reaching predicted time TTCy by dividing the lateral distance Dy by the lateral relative speed Vry (TTCy=Dy/Vry).

Then, the driving assistance apparatus 10 acquires the collision index value C by dividing the longitudinal reaching predicted time TTCx by the lateral reaching predicted time TTCy (C=TTCx/TTCy). The collision index value C acquired as such is one of values which decrease as the ratio of the longitudinal distance Dx relative to the lateral distance Dy decreases. Further, the collision index value C acquired as described above is one of values which (i) decrease as the ratio of the longitudinal distance Dx relative to the lateral distance Dy, (ii) decrease as the longitudinal relative speed Vrx increases, and (iii) increase as the lateral relative speed Vry increases.

When a collision condition that the collision index value C is in a predetermined index value range R, is satisfied, the driving assistance apparatus 10 determines that there is a collision probability that the own vehicle 100 turning right is going to collide with the alert-target oncoming vehicle 200.

The predetermined index value range R is previously set to a range including the collision index value C acquired when the lateral distance Dy and the longitudinal distance Dx are equal to each other. In particular, the predetermined index value range R is previously set to a range including one. The predetermined index value range R set as described above is one of ranges including the collision index value C acquired when the lateral distance Dy and the longitudinal distance Dx are equal to each other.

For example, when (i) the lateral reaching predicted time TTCy is 3 seconds, and (ii) the longitudinal reaching predicted time TTCx is 12 seconds, the collision index value C is 4. In this case, the own vehicle 100 crosses the oncoming lane LN2 before the alert-target oncoming vehicle 200 reaches a moving course of the own vehicle 100 turning right in case that the own vehicle 100 turns right at the current moving speed of the own vehicle 100. In other words, the own vehicle 100 can complete turning right without colliding with the alert-target oncoming vehicle 200 in case that the own vehicle 100 continues to turn right at the current moving speed of the own vehicle 100. As can be understood from the above description, an upper limit of the predetermined index value range R is set to a value which is greater than one and is the greatest one of values smaller than the smallest value that the own vehicle 100 can cross the oncoming lane LN2 before the alert-target oncoming vehicle 200 reaches the moving course of the own vehicle 100 turning right in case that the own vehicle 100 turning right at the current moving speed.

When (i) the lateral reaching predicted time TTCy is 5 seconds, and (ii) the longitudinal reaching predicted time TTCx is 1 second, the collision index value C is 0.2. In this case, in case that the own vehicle 100 turns right at the current moving speed, the own vehicle 100 crosses the oncoming lane LN2 after the alert-target oncoming vehicle 200 crosses the moving course of the own vehicle 100 turning right. In other words, in case that the own vehicle 100 turns right at the current moving speed, the own vehicle 100 can turn right without colliding with the alert-target oncoming vehicle 200. As can be understood, a lower limit of the predetermined index value range R is set to a value which is smaller than one and is the smallest one of values greater than the greatest value that the own vehicle 100 crosses the oncoming lane LN2 after the alert-target oncoming vehicle 200 crosses the moving course of the own vehicle 100 turning right in case that the own vehicle 100 turns right at the current moving speed.

Thus, as the collision index value C approaches one, the collision probability that the own vehicle 100 is going to collide with the alert-target oncoming vehicle 200, increases.

When the driving assistance apparatus 10 determines that the own vehicle 100 is going to collide with the alert-target oncoming vehicle 200, the driving assistance apparatus 10 executes the driving assistance control.

In this embodiment, the driving assistance control is a control to output alerting sounds from the sound device 61. In this regard, the driving assistance control may be a control to output announcements from the sound device 61 or a control to display alerting images by the displaying device 62.

In case that a determination that the own vehicle 100 is going to collide with the oncoming vehicle, is made after a certain time elapses since the own vehicle 100 starts performing the crossing movement, the determination may be wrong. Thus, in this case, if the driving assistance control is executed, the driving assistance control may be unnecessarily executed. For example, in case that the alert-target oncoming vehicle is specified, based on the surrounding detection information IS, a vehicle other than the oncoming vehicle may be detected and set as the alert-target oncoming vehicle after a certain time elapses since the own vehicle 100 starts performing the crossing movement.

Accordingly, the driving assistance apparatus 10 starts to measure an after-crossing-start elapsing time or a second elapsing time T2, i.e., a time elapsing since the driving assistance apparatus 10 determines that the own vehicle 100 starts performing crossing movement of the own vehicle 100.

Then, the driving assistance apparatus 10 repeatedly executes a process to determine whether there is the oncoming vehicle 200 to be the target for alerting by the driving assistance control, i.e., the alert-target oncoming vehicle 200, that is, a process to determine whether to detect the alert-target oncoming vehicle 200 until the second elapsing time T2 reaches a predetermined time, i.e., an after-crossing-start elapsing time threshold or a second elapsing time threshold T2th.

On the other hand, when the second elapsing time T2 becomes equal to or greater than the second elapsing time threshold T2th, the driving assistance apparatus 10 does not execute a process to determine whether the own vehicle 100 is going to collide with the alert-target oncoming vehicle 200. Thus, the driving assistance apparatus 10 does not execute the driving assistance control. That is, the driving assistance apparatus 10 is configured not to execute the driving assistance control after the second elapsing time threshold T2th elapses.

It should be noted that the second elapsing time threshold T2th is set to a time suitable to prevent the vehicle other than the oncoming vehicle from being set as the alert-target oncoming vehicle. The second elapsing time threshold T2th is set to a time equal to or shorter than a time predictively taken for the own vehicle 100 to reach the oncoming vehicle moving line L200 since the own vehicle 100 starts performing the crossing movement. Alternatively, the second elapsing time threshold T2th is set to a time equal to or shorter than a time predictively taken for the steering angle θ of 100 reaches a predetermine value, i.e., a steering angle threshold θth after the own vehicle 100 starts performing the crossing movement of the own vehicle 100. The steering angle threshold θth is set to a value of the steering angle θ taken when the own vehicle 100 has turned to an extent that the vehicle other than the oncoming vehicle is detected, based on the surrounding detection information IS.

<Advantages>

When the determination that the own vehicle 100 is going to collide with the oncoming vehicle 200, is made after a certain time elapses since the own vehicle 100 starts performing the crossing movement, the determination may be wrong. If the driving assistance control is executed when the determination is wrong, such an execution of the driving assistance control is an unnecessary one.

With the driving assistance apparatus 10, the driving assistance control is not executed even when there is generated a situation that the determination that the own vehicle 100 is going to collide with the alert-target oncoming vehicle 200, is made after the after-crossing-start elapsing time threshold elapses since the own vehicle 100 starts performing the crossing movement. Thus, the driving assistance control can be prevented from being unnecessarily executed.

<Specific Operations of Driving Assistance Apparatus>

Figure 8:
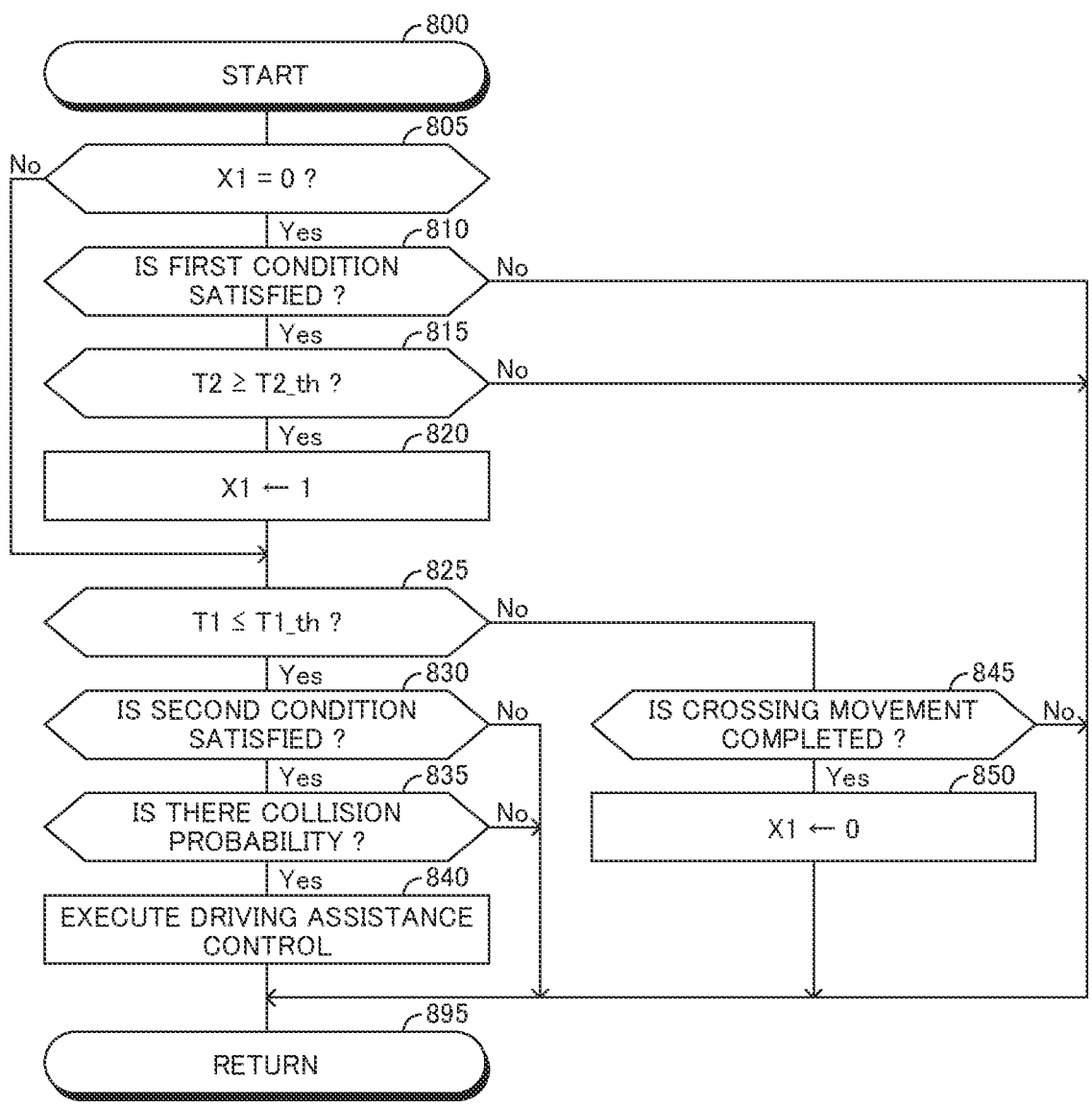
FIG. 8 is a view which shows a flowchart of a routine executed by the driving assistance apparatus according to the embodiment of the invention.

Next, specific operations of the driving assistance apparatus 10 will be described. The CPU of the ECU 90 of the driving assistance apparatus 10 is configured or programmed to execute a routine shown in FIG. 8 with a predetermined calculation cycle. Thus, at a predetermined timing, the CPU starts a process from a step 800 of the routine shown in FIG. 8 and proceeds with the process to a step 805 to determine whether a value of a crossing movement start flag X1 is "0." The value of the crossing movement start flag X1 is set to "1" until the crossing movement of the own vehicle 100 is determined to be completed since the own vehicle 100 is determined to start performing the crossing movement. On the other hand, the value of the crossing movement start flag X1 is set to "0" until the own vehicle 100 is determined to start performing the next crossing movement after the crossing movement of the own vehicle 100 this time is determined to be completed.

When the CPU determines "Yes" at the step 805, the CPU proceeds with the process to a step 810 to determine whether the first condition becomes satisfied. When the CPU determines "Yes" at the step 810, the CPU proceeds with the process to a step 815 to determine whether the second elapsing time T2 is equal to or greater than the second elapsing time threshold T2th. When the CPU determines "Yes" at the step 815, the CPU proceeds with the process to a step 820 to set the value of the crossing movement start flag X1 to "1." Then, the CPU proceeds with the process to a step 825.

On the other hand, when the CPU determines "No" at the step 805, the CPU proceeds with the process directly to the step 825.

When the CPU proceeds with the process to the step 825, the CPU determines whether the first elapsing time T1 is equal to or smaller than the first elapsing time threshold T1th. When the CPU determines "Yes" at the step 825, the CPU proceeds with the process to a step 830 to determine whether the second condition is satisfied. When the CPU determines "Yes" at the step 830, the CPU proceeds with the process to a step 835 to determine whether the alert-target oncoming vehicle 200 is going to collide with the own vehicle 100. When the CPU determines "Yes" at the step 835, the CPU proceeds with the process to a step 840 to execute the driving assistance control. That is, the CPU alerts the driver. Then, the CPU proceeds with the process to a step 895 to terminate executing this routine once.

On the other hand, when the CPU determines "No" at the step 830 or the step 835, the CPU proceeds with the process directly to the step 895 to terminate executing this routine once.

When the CPU determines "No" at the step 825, the CPU proceeds with the process to a step 845 to determine whether the crossing movement of the own vehicle 100 is completed. When the CPU determines "Yes" at the step 845, the CPU proceeds with the process to a step 850 to set the value of the crossing movement start flag X1 to "0." Then, the CPU proceeds with the process to the step 895 to terminate executing this routine once.

On the other hand, when the CPU determines "No" at the step 810, or the step 815, or the step 845, the CPU proceeds with the process directly to the step 895 to terminate executing this routine once.

It should be noted that the invention is not limited to the aforementioned embodiments, and various modifications can be employed within the scope of the invention.

What is claimed is:

1. A driving assistance apparatus, comprising an electronic control unit which executes a driving assistance control to alert a driver of an own vehicle for avoiding a collision of the own vehicle with an oncoming vehicle when the own vehicle performs a crossing movement,
    the crossing movement being a movement of the own vehicle to turn, crossing a line along which the oncoming vehicle moves,
    wherein the electronic control unit is configured to:
        detect and set the oncoming vehicle as an alert-target oncoming vehicle;
        execute the driving assistance control when determining that the own vehicle is going to collide with the alert-target oncoming vehicle after determining that the crossing movement of the own vehicle starts and before a predetermined after-crossing-start elapsing time elapses;
        keep the driving assistance control unexecuted after an after-crossing-start elapsing time threshold elapses;
        set as the alert-target oncoming vehicle, a vehicle which is in a predetermined area ahead of the own vehicle and approaches the own vehicle;
        set as the alert-target oncoming vehicle, a vehicle which is in the predetermined area corresponding to a predetermined front right area ahead of the own vehicle on the right and approaches the own vehicle when determining that a right turn crossing movement of the own vehicle starts,
            the right turn crossing movement of the own vehicle being the crossing movement of the own vehicle to turn right, crossing the line along which the oncoming vehicle moves, and
        set as the alert-target oncoming vehicle, a vehicle which is in the predetermined area corresponding to a predetermined front left area ahead of the own vehicle on the left and approaches the own vehicle when determining that a left turn crossing movement of the own vehicle starts,
            the left turn crossing movement of the own vehicle being the crossing movement of the own vehicle to turn left, crossing the line along which the oncoming vehicle moves.

2. The driving assistance apparatus as set forth in claim 1, wherein the electronic control unit is configured not to determine that the crossing movement of the own vehicle starts when (i) a crossing-movement driving operation for performing the crossing movement of the own vehicle is carried out, and (ii) a time elapsing since starting to execute the driving assistance control is smaller than a predetermined after-alerting elapsing time threshold.

3. The driving assistance apparatus as set forth in claim 1, wherein the electronic control unit is configured not to determine that the crossing movement of the own vehicle starts when (i) a crossing-movement driving operation for performing the crossing movement of the own vehicle is carried out, and (ii) a moving speed of the own vehicle is equal to or smaller than a predetermined speed threshold.

4. The driving assistance apparatus as set forth in claim 1, wherein the electronic control unit is configured not to determine that the crossing movement of the own vehicle starts when (i) a crossing movement driving operation for performing the crossing movement of the own vehicle is carried out, and (ii) a braking driving operation for applying a braking force to the own vehicle is carried out.

5. The driving assistance apparatus as set forth in claim 1, wherein the after-crossing-start elapsing time threshold is set to a time equal to or smaller than a time predictively taken for the own vehicle to reach the line since the crossing movement of the own vehicle starts.

6. The driving assistance apparatus as set forth in claim 1, wherein the after-crossing-start elapsing time threshold is set to a time equal to or smaller than a time predictively taken for a steering angle of the own vehicle to reach a predetermined steering angle threshold since the crossing movement of the own vehicle starts.

7. A driving assistance method for executing a driving assistance control to alert a driver of an own vehicle for avoiding a collision of the own vehicle with an oncoming vehicle when the own vehicle performs a crossing movement,
    the crossing movement being a movement of the own vehicle to turn, crossing a line along which the oncoming vehicle moves,
    wherein the driving assistance method comprises steps of:
        detecting and setting the oncoming vehicle as an alert-target oncoming vehicle;

executing the driving assistance control when determining that the own vehicle is going to collide with the alert-target oncoming vehicle after determining that the crossing movement of the own vehicle starts and before a predetermined after-crossing-start elapsing time elapses;

keeping the driving assistance control unexecuted after an after-crossing-start elapsing time threshold elapses;

setting as the alert-target oncoming vehicle, a vehicle which is in a predetermined area ahead of the own vehicle and approaches the own vehicle;

setting as the alert-target oncoming vehicle, a vehicle which is in the predetermined area corresponding to a predetermined front right area ahead of the own vehicle on the right and approaches the own vehicle when determining that a right turn crossing movement of the own vehicle starts, the right turn crossing movement of the own vehicle being the crossing movement of the own vehicle to turn right, crossing the line along which the oncoming vehicle moves; and setting as the alert-target oncoming vehicle, a vehicle which is in the predetermined area corresponding to a predetermined front left area ahead of the own vehicle on the left and approaches the own vehicle when determining that a left turn crossing movement of the own vehicle starts, the left turn crossing movement of the own vehicle being the crossing movement of the own vehicle to turn left, crossing the line along which the oncoming vehicle moves.

8. A computer-readable storage medium storing a driving assistance program which executes a driving assistance control to alert a driver of an own vehicle for avoiding a collision of the own vehicle with an oncoming vehicle when the own vehicle performs a crossing movement, the crossing movement being a movement of the own vehicle to turn, crossing a line along which the oncoming vehicle moves, wherein the driving assistance program is configured to:

detect and set the oncoming vehicle as an alert-target oncoming vehicle;

execute the driving assistance control when determining that the own vehicle is going to collide with the alert-target oncoming vehicle after determining that the crossing movement of the own vehicle starts and before a predetermined after-crossing-start elapsing time elapses;

keep the driving assistance control unexecuted after an after-crossing-start elapsing time threshold elapses;

set as the alert-target oncoming vehicle, a vehicle which is in a predetermined area ahead of the own vehicle and approaches the own vehicle;

set as the alert-target oncoming vehicle, a vehicle which is in the predetermined area corresponding to a predetermined front right area ahead of the own vehicle on the right and approaches the own vehicle when determining that a right turn crossing movement of the own vehicle starts, the right turn crossing movement of the own vehicle being the crossing movement of the own vehicle to turn right, crossing the line along which the oncoming vehicle moves; and set as the alert-target oncoming vehicle, a vehicle which is in the predetermined area corresponding to a predetermined front left area ahead of the own vehicle on the left and approaches the own vehicle when determining that a left turn crossing movement of the own vehicle starts, the left turn crossing movement of the own vehicle being the crossing movement of the own vehicle to turn left, crossing the line along which the oncoming vehicle moves.

\* \* \* \* \*